United States Patent
Yamasaki et al.

(10) Patent No.: US 11,118,985 B2
(45) Date of Patent: Sep. 14, 2021

(54) LOAD SENSOR AND ELECTROMECHANICAL BRAKE SYSTEM

(71) Applicant: NTN CORPORATION, Osaka (JP)

(72) Inventors: Tatsuya Yamasaki, Shizuoka (JP); Yui Masuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 107 days.

(21) Appl. No.: 16/473,884

(22) PCT Filed: Dec. 26, 2017

(86) PCT No.: PCT/JP2017/046606
§ 371 (c)(1),
(2) Date: Jun. 26, 2019

(87) PCT Pub. No.: WO2018/124059
PCT Pub. Date: Jul. 5, 2018

(65) Prior Publication Data
US 2019/0339139 A1 Nov. 7, 2019

(30) Foreign Application Priority Data

Dec. 28, 2016 (JP) .............................. JP2016-254881

(51) Int. Cl.
*G01L 1/12* (2006.01)
*F16D 55/226* (2006.01)
(Continued)

(52) U.S. Cl.
CPC .............. *G01L 1/12* (2013.01); *F16D 55/226* (2013.01); *G01L 5/28* (2013.01); *B60T 1/065* (2013.01);
(Continued)

(58) Field of Classification Search
CPC .. B60T 1/065; F16D 2121/14; F16D 2121/24; F16D 2125/40; F16D 55/226;
(Continued)

(56) References Cited

U.S. PATENT DOCUMENTS 5,773,728 A 6/1998 Tsukada et al.
6,139,117 A * 10/2000 Shirai ..................... B60T 13/74
188/1.11 R
(Continued)

FOREIGN PATENT DOCUMENTS

JP 64-6836 1/1989
JP 8-271363 10/1996
(Continued)

OTHER PUBLICATIONS

Extended European Search Report dated Jan. 2, 2020 in European Patent Application No. 17886969.9.
(Continued)

*Primary Examiner* — Robert A. Siconolfi
*Assistant Examiner* — San M Aung
(74) *Attorney, Agent, or Firm* — Wenderoth, Lind & Ponack, L.L.P.

(57) ABSTRACT

A load sensor to be used in an electromechanical brake system includes a flange member capable of deflecting when receiving, at a load receiving portion, a load from the axially front side; a support member capable of supporting the flange member from the axially rear side, at a support portion displaced from the load receiving portion in a radial direction orthogonal to the axial direction; and a displacement detecting mechanism configured to detect the amount of relative movement between the flange and support members. A variable detection sensitivity mechanism enables the relative movement amount with respect to the change of the load applied to the flange member to be larger in a low load
(Continued)

range in which the load is equal to or lower than a predetermined load value than in a high load range in which the load is higher than the predetermined load value.

8 Claims, 9 Drawing Sheets

(51) Int. Cl.
    *G01L 5/28*     (2006.01)
    *B60T 1/06*     (2006.01)
    *F16D 121/14*     (2012.01)
    *F16D 121/24*     (2012.01)
    *F16D 125/40*     (2012.01)
    *F16H 25/22*     (2006.01)

(52) U.S. Cl.
    CPC ...... *F16D 2121/14* (2013.01); *F16D 2121/24* (2013.01); *F16D 2125/40* (2013.01); *F16H 25/2252* (2013.01); *F16H 25/2266* (2013.01); *F16H 2025/228* (2013.01); *F16H 2025/2276* (2013.01)

(58) Field of Classification Search
    CPC ............. F16H 25/2252; F16H 25/2266; F16H 2025/2276; F16H 2025/228; G01L 1/12; G01L 1/127; G01L 5/12; G01L 5/28; G01L 5/0038
    USPC .................................. 188/1.11 E, 72.1, 72.3
    See application file for complete search history.

(56) References Cited

U.S. PATENT DOCUMENTS

| | | |
|---|---|---|
| 2004/0163900 A1 | 8/2004 | Beuerle et al. |
| 2013/0048443 A1* | 2/2013 | Muramatsu ............. F16D 65/18 |
| | | 188/72.1 |
| 2013/0105254 A1* | 5/2013 | Isono .................... B60T 13/745 |
| | | 188/72.3 |
| 2015/0204736 A1 | 7/2015 | Masuda |
| 2015/0346043 A1 | 12/2015 | Kohuth et al. |
| 2015/0360656 A1* | 12/2015 | Masuda .................. F16D 65/18 |
| | | 188/162 |
| 2017/0066428 A1 | 3/2017 | Masuda |

FOREIGN PATENT DOCUMENTS

| | | |
|---|---|---|
| JP | 2005-106487 | 4/2005 |
| JP | 2013-257000 | 12/2013 |
| JP | 2014-16307 | 1/2014 |
| WO | 2015/178275 | 11/2015 |
| WO | 2016/035610 | 3/2016 |

OTHER PUBLICATIONS

International Search Report dated Mar. 13, 2018 in corresponding International (PCT) Application No. PCT/JP2017/046606.
International Preliminary Report on Patentability dated Jul. 2, 2019 in corresponding International (PCT) Application No. PCT/JP2017/046606.

\* cited by examiner

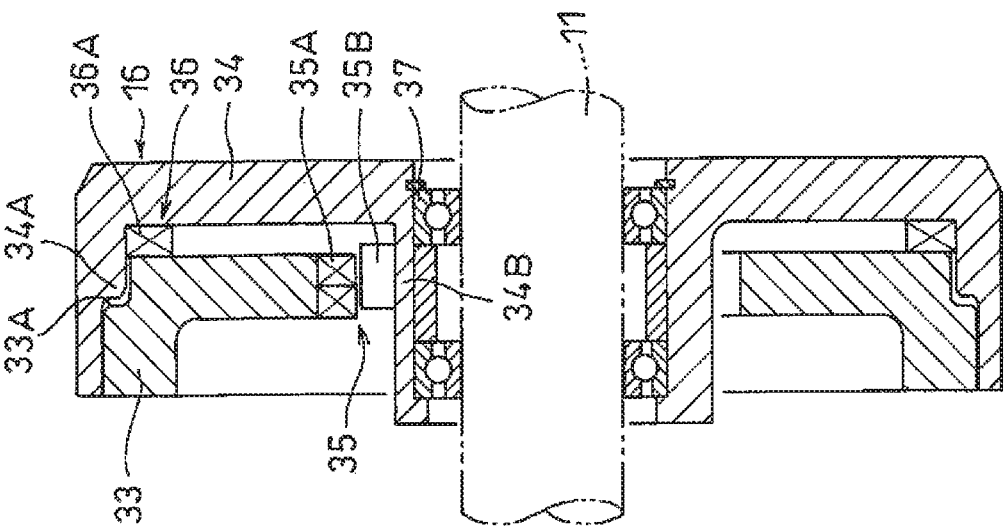
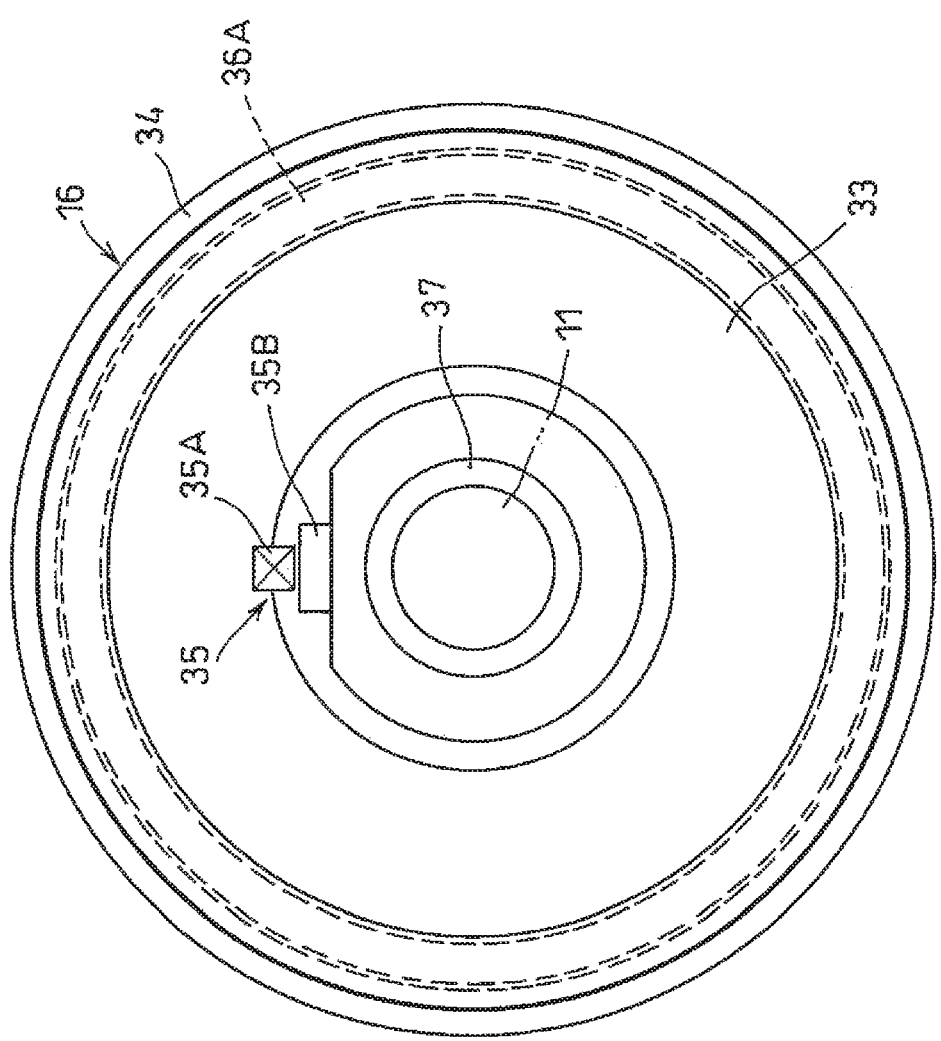
FIG. 5B
FIG. 5A

LOAD SENSOR AND ELECTROMECHANICAL BRAKE SYSTEM

TECHNICAL FIELD

The present invention relates to a load sensor and an electromechanical brake system in which the load sensor is used.

BACKGROUND ART

For example, in an electromechanical brake system having the structure of the present invention illustrated in FIG. 1, the rotational driving force of an electric motor 10 is transmitted to a rotary shaft 11 through a reduction mechanism 26; the rotation of the rotary shaft 11 is converted into the axial movement of a linear motion member 12 by a linear motion conversion mechanism 13; and a friction pad 15 is axially moved together with the linear motion member 12, and is pressed against a brake disk 17, thereby generating a braking force. In order to control this braking force to a desired magnitude, a load sensor 16 is frequently mounted at the portion of the electromechanical brake system receiving the reaction force to the load applied to the friction pad 15, for example, mounted between the linear motion conversion mechanism 13 and a caliper housing 25 so as to detect the magnitude of the load due to the reaction force (braking force).

For example, the below-identified Patent Document 1 discloses a general load sensor including a flange member; a support member supporting the flange member from the axially rear side; and a displacement detecting mechanism configured to detect the amount by which the flange member and the support member axially move relative to each other.

For example, as illustrated in FIG. 1 of Japanese Unexamined Patent Application Publication No. 2014-16307, the displacement detecting mechanism may be a magnetic one constituted by a magnetic target fixed to the flange member; and a magnetic sensor element fixed to the support member, and radially opposed to the magnetic target. The magnetic sensor element detects the magnetic flux generated from the magnetic target. When the load due to the reaction force is applied to the flange member, the flange member is displaced in the direction in which the load is applied, thereby changing the relative position between the magnetic target and the magnetic sensor element. The magnitude of the magnetic flux detected by the magnetic sensor element changes according to the change of the above relative position. It is possible to detect the magnitude of the above load from the amount by which the magnitude of this magnetic flux changes.

The amount by which the flange member and the support member move relative to each other is determined by the load and the Young's modulus of the material forming the flange member. The detection sensitivity of the load sensor with respect to the change of the load applied to the flange member is substantially uniform from low to high load ranges of the load.

In electromechanical brake systems, while, in a low load range, subtle brake operation by a driver needs to be accurately reflected in the braking force so that the driver can have good operation feeling, the subtle control of the braking force is not required so much in the high load range in many cases.

If the flange member is made of a material having a high Young's modulus, the amount by which the flange member and the support member move relative to each other is small. Therefore, it is impossible to fully meet the requirement for detecting the change of the load with high sensitivity in a low load range, and thus a driver may not be able to have good operation feeling. On the other hand, if the flange member is made of a material having a low Young's modulus, while it is possible to ensure high detection sensitivity with respect to the change of a load in the low load range, it may be difficult to ensure the durability of the flange member and responsiveness to the change of the load. In this way, it is very difficult to ensure both high detection sensitivity in the low load range, and durability and responsiveness in the high load range.

It is an object of the present invention to ensure both high detection sensitivity with respect to the change of the load in the low load range, and durability and responsiveness in the high load range

SUMMARY OF THE INVENTION

In order to achieve the above object, the present invention provides a load sensor comprising: a flange member capable of deflecting when receiving, at a load receiving portion, a load from a front side in an axial direction; a support member capable of supporting the flange member from a rear side in the axial direction, at a support portion displaced from the load receiving portion in a radial direction orthogonal to the axial direction; a displacement detecting mechanism configured to detect a relative movement amount by which the flange member and the support member move relative to each other; and a variable detection sensitivity mechanism enabling the relative movement amount with respect to a change of the load applied to the flange member to be larger in a low load range in which the load is equal to or lower than a predetermined load value than in a high load range in which the load is higher the predetermined load value.

By changing the detection sensitivity of the load sensor with respect to the change of the load applied to the flange member according to the magnitude of the load, it is possible to increase the detection sensitivity of the load sensor in the low load range, in which the braking force is weak, thereby generating an accurate braking force. Also, it is possible to ensure durability and responsiveness with respect to repeated loads in the high load range.

For the above load sensor, the variable detection sensitivity mechanism comprises an elastic member disposed between the flange member and the support member. The elastic member is configured such that, while the load is equal to or lower than the predetermined load value, the elastic member can be expanded and compressed according to a magnitude of the load so as to allow the flange member and the support member to move relative to each other in directions in which the elastic member is expanded and compressed.

By disposing the elastic member between the flange member and the support member, it is possible to move the flange member and the support member relative to each other without depending on the elastic deformation of the flange member in the low load range, and thus to increase the detection sensitivity of the load sensor in the low load range.

The support portion comprises: a first support portion at which the flange member and the support member abut against each other while the load is equal to or lower than the predetermined load value; and a second support portion at which the flange member and the support member abut against each other while the load is higher than the predetermined load value, and the variable detection sensitivity mechanism includes the first support portion and the second support portion.

In this arrangement, the amount by which the flange member is displaced with respect to the same amount of change in load is larger in the low load range than in the high load range. Therefore, it is possible to increase the detection sensitivity of the load sensor in the low load range.

For the above load sensor, the displacement detecting mechanism preferably comprises: a magnetic target on one of the flange member and the support member, the magnetic target generating a magnetic flux; and a magnetic sensor element on the other of the flange member and the support member, magnetic sensor element being configured to detect the magnetic flux generated from the magnetic target.

By using such a magnetic sensor arrangement, it is possible to simplify the structure of the load sensor, and to detect, with high accuracy, the amount of relative movement between the flange member and the support member.

The above-described load sensor may be used in an electromechanical brake system comprising: an electric motor; a rotary shaft configured to be rotated about an axis of the rotary shaft by a rotationally driving force of the electric motor; a linear motion member movable in an axial direction of the rotary shaft; a linear motion conversion mechanism configured to convert rotation of the rotary shaft into an axial movement of the linear motion member; a friction pad disposed on one side of the linear motion member in the axial direction, and configured to move in the axial direction with the axial movement of the linear motion member.

The load sensor of the present invention includes a variable detection sensitivity mechanism enabling the relative movement amount with respect to the change of the load applied to the flange member to be larger in the low load range (area in which the load is equal to or lower than a predetermined load values) than in the high load range (area in which the load is higher than the predetermined load value). Therefore, it is possible to increase the detection sensitivity of the load sensor in the low load range, in which the braking force is weak, thereby generating an accurate braking force. Also, it is possible to ensure durability and responsiveness with respect to repeated loads in the high load range.

BRIEF DESCRIPTION OF THE DRAWINGS

FIG. 5A is a front view of a load sensor according to a first embodiment of the present invention.

FIG. 5B is a sectional view of the load sensor according to the first embodiment, when seen from its lateral side.

DETAILED DESCRIPTION OF THE INVENTION

Figure 1:
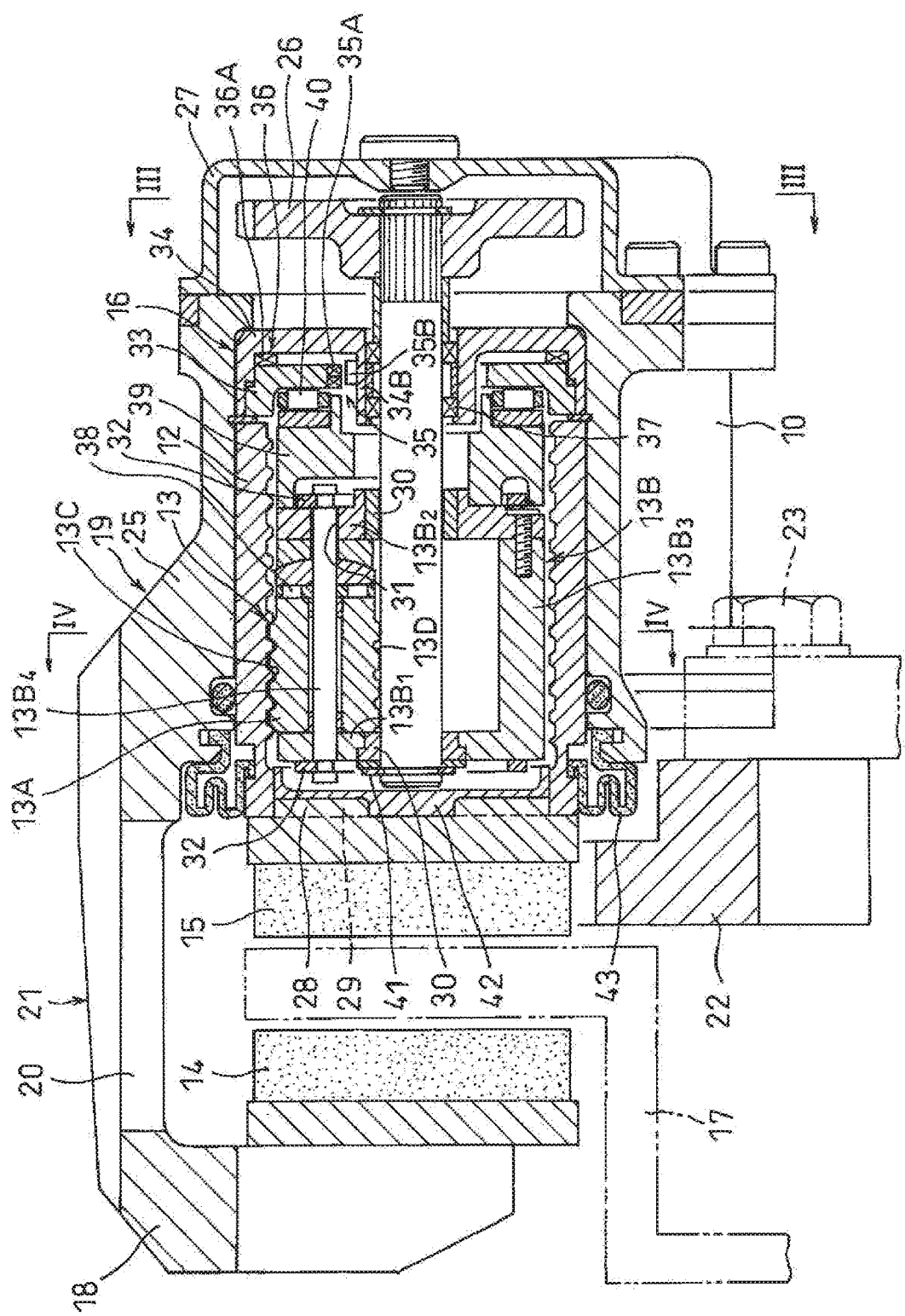
FIG. 1 is a sectional view of an electromechanical brake system according to the present invention, when seen from its lateral side.
Figure 2:
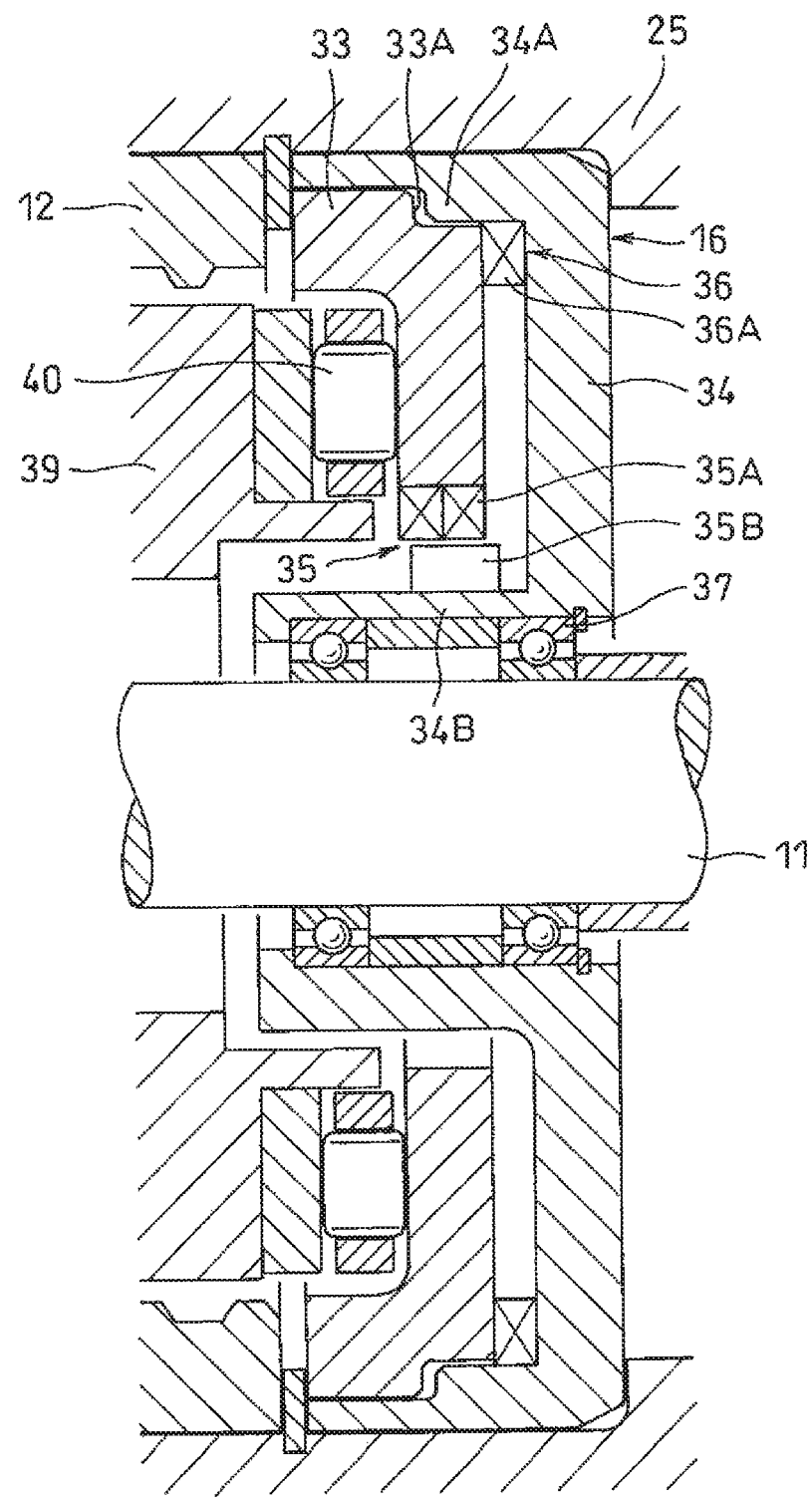
FIG. 2 is a sectional view of a portion of the electromechanical brake system.
Figure 3:
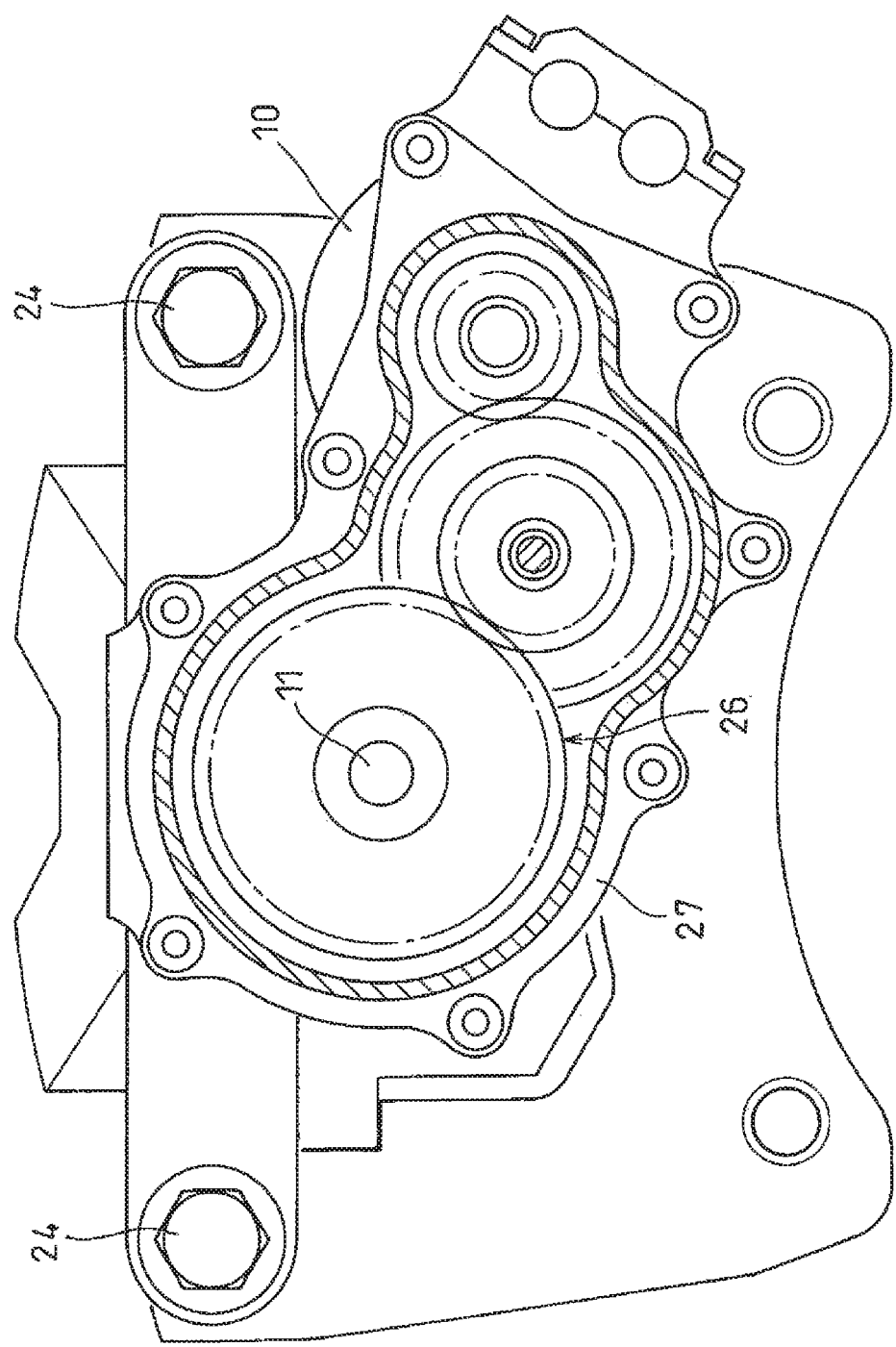
FIG. 3 is a sectional view taken along line III-III of FIG. 1.

FIGS. 1 to 4 illustrate an electromechanical brake system embodying the present invention. The electromechanical brake system includes, as its main elements, a rotary shaft 11 configured to be rotated about its axis by the rotationally driving force of an electric motor 10; a linear motion member 12 movable in the axial direction of the rotary shaft 11; a linear motion conversion mechanism 13 configured to convert the rotation of the rotary shaft 11 into the axial movement of the linear motion member 12; friction pads 14 and 15 located axially forward of the linear motion member 12, and configured to axially move due to the axial movement of the linear motion member 12; and a load sensor 16 configured to detect the load due to the reaction force from the friction pad 15.

The electromechanical brake system further includes a brake disk 17 configured to rotate together with a vehicle wheel (not shown). The (pair of) friction pads 14 and 15 are axially opposed to each other through the brake disk 17. A braking force is generated by pressing the friction pads 14 and 15 against the brake disk 17 with the motive power transmitted from the electric motor 10.

The electromechanical brake system further includes a caliper body 21 having a pair of opposed portions 18 and 19 axially opposed to each other through the brake disk 17, and coupled together by a bridge 20 located radially outwardly of the brake disk 17. The friction pad 14 is disposed between the opposed portion 18 of the caliper body 21 and the brake disk 17. The friction pad 15 is disposed between the other opposed portion 19 and the brake disk 17. The friction pads 14 and 15 are guided in the axial direction of the brake disk 17 by pad pins (not shown) mounted to the caliper body 21, or by slide portions (not shown) of a caliper bracket 22.

The caliper body 21 is supported by slide pins 24 mounted to the caliper bracket 22 (see FIG. 3) so as to be movable in the axial direction of the brake disk 17. The caliper bracket 22 is fixed by bolts 23 to a knuckle (not shown) supporting the vehicle wheel. Therefore, when the friction pad 15 is moved in the axially forward direction, and is pressed against the brake disk 17, the caliper body 21 moves in the axially rearward direction due to the reaction force applied from the brake disk 17 to the caliper body 21, so that the friction pad 14 on the opposite side is also pressed against the brake disk 17.

As illustrated in FIG. 1, the opposed portion 19 of the caliper body 21 comprises a cylindrical caliper housing 25 having axially front and rear end openings, and receiving the rotary shaft 11; an outer ring member surrounding the rotary shaft 11 and functioning as the linear motion member 12 (the outer ring member is therefore designated by the same reference numeral as the linear motion member, namely "12"); and a planetary roller screw mechanism functioning as the linear motion conversion mechanism 13, that is, configured to convert the rotation of the rotary shaft 11 into the axial movement of the outer ring member 12 (the planetary roller screw mechanism is therefore designated by the same reference numeral as the linear motion conversion mechanism, namely "13"). The friction pad 15 is disposed axially forward of the outer ring member 12.

The electric motor 10 is in juxtaposition with the caliper body 25. A reduction mechanism 26 is disposed between the electric motor 10 and the rotary shaft 11 such that the rotation of the electric motor 10 is reduced in speed, and transmitted to the rotary shaft 11 through the reduction mechanism 26. The reduction mechanism 26 is received in a cover 27 surrounding the axially rear end opening of the caliper housing 25.

Figure 4:
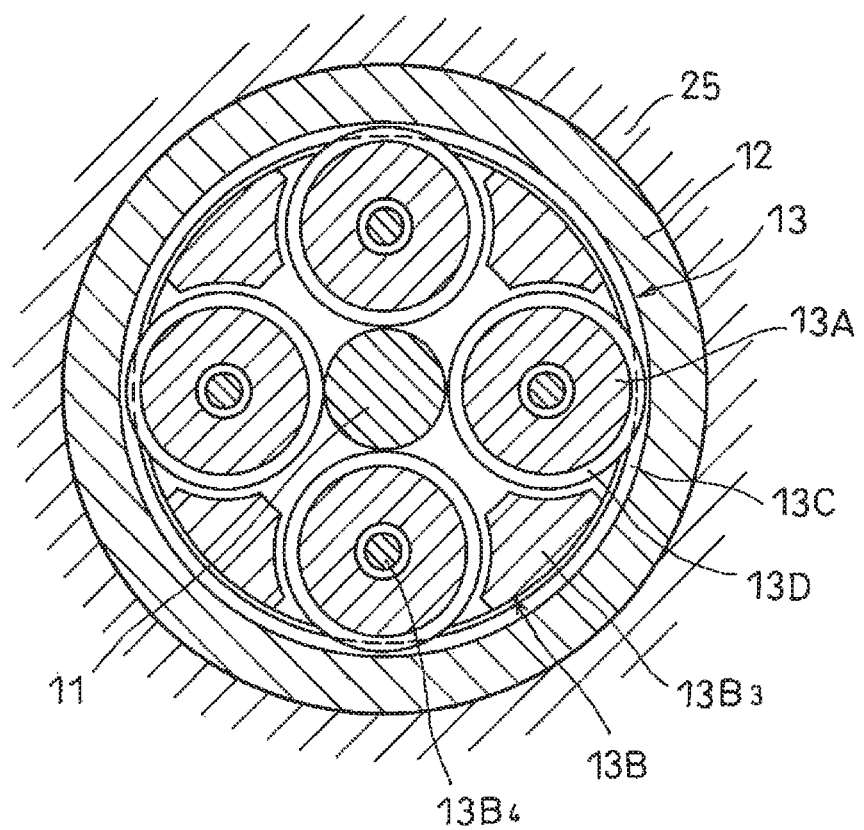
FIG. 4 is a sectional view taken along line IV-IV of FIG. 1.

As illustrated in FIG. 4, the planetary roller screw mechanism 13 includes a plurality of planetary rollers 13A that are in contact with the rotary shaft 11 from outside and with the outer ring member 12 from inside; a carrier 13B supporting the planetary rollers 13A such that the planetary rollers 13A can rotate about their respective axes while revolving around the rotary shaft 11; a helical rib 13C on the inner periphery of the outer ring member 12; and circumferential grooves 13D in the outer peripheries of the planetary rollers 13A such that the helical rib 13C is engaged in the circumferential grooves 13D.

The planetary rollers 13A are circumferentially equidistantly spaced apart from each other, and in rolling contact with the outer periphery of the rotary shaft 11 and the inner periphery of the outer ring member 12. The portion of the rotary shaft 11 with which the planetary rollers 13A are in contact is a cylindrical surface. When the rotary shaft 11 rotates, the planetary rollers 13A revolve around the rotary shaft 11 while rotating about respective roller shafts 13B$_4$. In other words, at this time, the planetary rollers 13A rotate about their axes due to the rotational forces which the planetary rollers 13A receive from the outer periphery of the rotary shaft 11, and thus revolve about the rotary shaft 11 while rolling on the inner periphery of the outer ring member 12.

The helical rib 13C on the inner periphery of the outer ring member 12 extends obliquely with respect to the circumferential direction. The circumferential grooves 13D on the outer periphery of each planetary roller 13A extend parallel to the circumferential direction, i.e., have a 0 degree lead angle. Instead of the circumferential grooves 13D, however, each planetary roller 13A may have, on its outer periphery, a helical groove having a lead angle different from that of the helical rib 13C.

The outer ring member 12 is axially movably supported by the inner surface of the caliper housing 25. The portion of the inner surface of the caliper housing 25 with which the outer ring member 12 comes into contact is a cylindrical surface. The outer ring member 12 has recesses 29 in which protrusions 28 on the back surface of the friction pad 15 are engaged, thereby rotationally fixing the outer ring member 12 to the caliper housing 25.

The carrier 13B includes a pair of carrier plates 13B$_1$ and 13B$_2$ axially opposed to each other through the planetary rollers 13A; coupling portions 13B$_3$ axially extending between the respective circumferentially adjacent pairs of planetary rollers 13A, and coupling the carrier plates 13B$_1$ and 13B$_2$ together; and the above-mentioned roller shafts 13B$_4$ which support the respective planetary rollers 13A so as to be rotatable about their axes. The carrier plates 13B$_1$ and 13B$_2$ are annularly shaped, and the rotary shaft 11 extends through the carrier plates 13B$_1$ and 13B$_2$. Sliding bearings 30 are mounted on the inner peripheries of the respective carrier plates 13B$_1$ and 13B$_2$ so as to be in sliding contact with the outer periphery of the rotary shaft 11.

The carrier plates 13B$_1$ and 13B$_2$ are each formed with elongated holes 31, and both ends of each roller shaft 13B$_4$ are supported by the corresponding elongated holes 31 of the carrier plates 13B$_1$ and 13B$_2$ so as to be movable in the radial direction of the outer ring member 12. Two elastic rings 32 are wrapped around the respective opposite ends of the roller shafts 13B$_4$ of all of the circumferentially spaced apart planetary rollers 13A. The elastic rings 32 press the planetary rollers 13A against the outer periphery of the roller shaft 11, thereby preventing slippage between the planetary rollers 13A and the rotary shaft 11.

As illustrated in FIGS. 5A and 5B, the load sensor 16 according to the first embodiment of the present invention is disposed axially rearward of the outer ring member 12. The load sensor 16 is configured to receive a load due to the reaction force from the friction pad 15, through the linear motion conversion mechanism (planetary roller screw mechanism) 13, and detect the magnitude of this load (braking force). The load sensor 16 comprises a flange member 33 capable of deflecting when receiving, at a load receiving portion $P_1$, the above load, namely a load from the axially front side; a support member 34 capable of supporting the flange member 33 from the axial rear side, at a support portion $P_2$ radially displaced from the load receiving portion $P_1$ (see FIG. 6B); a displacement detecting mechanism 35 configured to detect the amount by which the flange member 33 and the support member 34 move relative to each other (this amount is hereinafter referred to as "the relative movement amount"); and a variable detection sensitivity mechanism 36 enabling detection of the change in load applied to the flange member 33 with higher sensitivity while the load is low than while the load is high.

The displacement detecting mechanism 35 is constituted by a magnetic target 35A mounted to the flange member 33, and generating a magnetic flux; and a magnetic sensor element 35B mounted to the support member 34 so as to be opposed to the magnetic target 35A, and configured to detect the magnetic flux generated by the magnetic target 35A.

The flange member 33 is a circular annular plate-shaped member made of a metal such as iron. The support member 34 is made of a metal such as iron, and inserted onto an outer peripheral edge portion of the flange member 33 so as to be axially movable, i.e., slidable, relative to the outer peripheral edge portion of the flange member 33. The flange member 33 has a step 33A formed on its outer peripheral edge portion, while the support member 34 has a protrusion 34A on the inner surface of its outer peripheral edge portion. When the flange member 33 moves relative to the support member 34, and the step 33A abuts against the protrusion 34A, the movement of the flange member 33 relative to the support member 34 is restricted (see FIG. 6B).

The outer peripheral edge portion of the support member 34 is immovably supported by the inner surface of the caliper housing 25. The support member 34 includes, on its inner peripheral side, a cylindrical portion 34B integrally connected to the support member 34 so as to be opposed to the radially inner side of the flange member 33. A plurality of bearings 37 are mounted to the inner periphery of the cylindrical portion 34B so as to be axially spaced apart from each other, thereby enabling relative rotation between the rotary shaft 11 and the load sensor 16 about the axis of the rotary shaft 11. The magnetic target 35A is fixed to the inner periphery of the flange member 33. The magnetic sensor element 35B is fixed to the outer periphery of the cylindrical portion 34B of the support member 34.

Figure 6A:
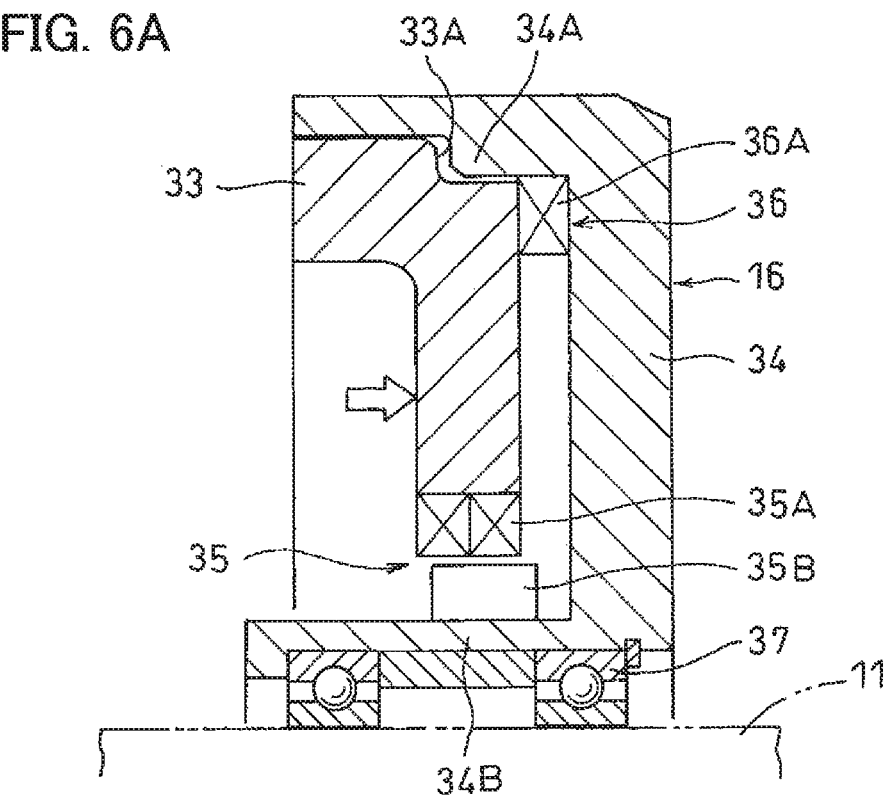
FIG. 6A is a sectional view of the load sensor of FIGS. 5A and 5B, the sectional view illustrating a low load range.
Figure 6B:
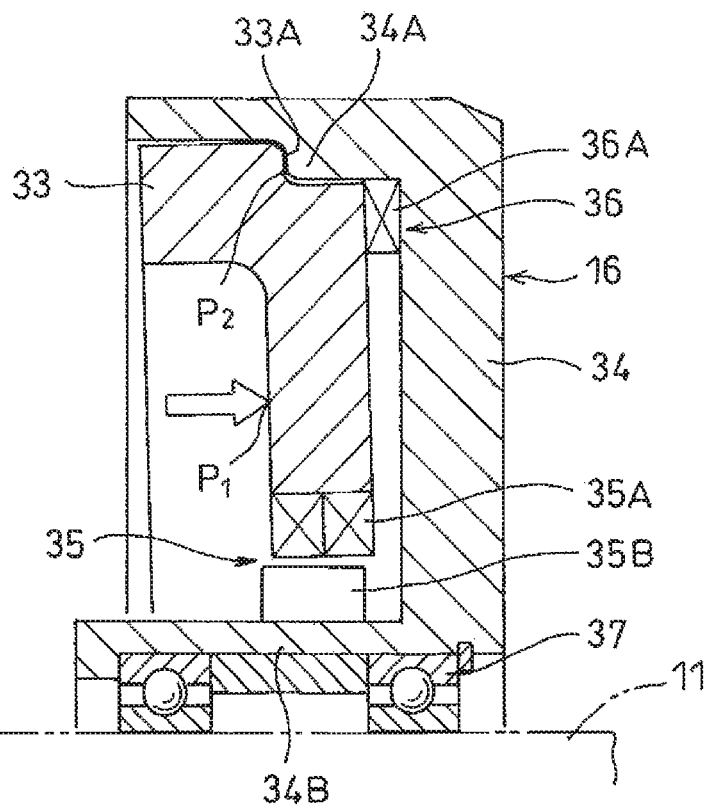
FIG. 6B is a sectional view of the load sensor of FIGS. 5A and 5B, the sectional view illustrating a high load range.

The variable detection sensitivity mechanism 36 comprises an elastic member 36A disposed between the flange member 33 and the support member 34. The elastic member 36A is arranged and configured such that, while the load applied to the flange member 33 is in a low load range in which the load is equal to or lower than a predetermined load value, the elastic member 36A is expanded and compressed according to the magnitude of the load applied to the flange member. Thus, the flange member 33 and the support member 34 are allowed to move, i.e., slide, relative to each other in the directions in which the elastic member 36A is expanded or compressed. As illustrated in FIG. 6A, while the load applied to the flange member is in the low load range, the flange member 33 and the support member 34 are kept axially separated from each other by the biasing force of the elastic member 36A.

The elastic member 36A may be, for example, an elastic structure such as a spring, or an element made of an elastic material such as rubber. The structure and material of the elastic member 36A are determined such that the elastic member 36A has a rigidity lower than that of the flange member 33. Therefore, while the load applied to the flange member is in the low load range, the flange member 33 hardly deflects, and the flange member 33 moves relative to the support member 34 solely due to the compression of the elastic member 36. The elastic member 36A is a separate member in this embodiment, but may be integral with the flange member 33 or the support member 34 for reduced number of parts and possible reduction in manufacturing costs.

A thrust bearing 38 is mounted between each planetary roller 13A and the carrier plate 13B$_2$ on the axially rear side of the planetary roller 13A to support the planetary roller 13A for rotation about its axis. Between the carrier plate 13B$_2$ and (the flange member 33 of) the load sensor 16, there are mounted a thrust plate 39 configured to rotate together with the carrier plate 13B$_2$; and a thrust bearing 40 rotatably supporting the thrust plate 39.

The load sensor 16 axially supports the carrier plate 13B$_2$ through the thrust plate 39 and the thrust bearing 40, thereby restricting the axially rearward movement of the carrier 13B. A snap ring 41 is mounted to the axially front end of the rotary shaft 11 to restrict the axially forward movement of the axially forward carrier plate 13B$_1$. Therefore, both of the axially forward and rearward movements of the carrier 13B are restricted, so that the axial movements of the planetary rollers 13A, which are retained by the carrier 13B, are also restricted.

A seal cover 42 is mounted to the axially front end of the outer ring member 12 so as to close the axially front end opening of the outer ring member 12, thereby preventing foreign matter from entering the outer ring member 12. One end of an axially stretchable tubular bellows 43 is fixed to the axially front end of the outer ring member 12, and the other end of the bellows 43 is fixed to the edge of the axially front opening of the caliper housing 25. The bellows 43 prevents foreign matter from entering the space between the sliding surfaces of the outer ring member 12 and the caliper housing 25.

When the electric motor 10 is rotated, the rotation of the electric motor 10 is transmitted to the rotary shaft 11 through the reduction mechanism 26, so that the planetary rollers 13A of the planetary roller screw mechanism 13 revolve around the rotary shaft 11 while rotating about their axes (see FIG. 4). This allows the outer ring member 12 and the planetary rollers 13A to axially move relative to each other due to the difference between the lead angles of the helical rib 13c and the circumferential grooves 13D. However, since the axial movements of the planetary rollers 13A as well as the carrier 13B are restricted, the planetary rollers 13A do not axially move, so that only the outer ring member 12 axially moves. When the rotary shaft 11 is rotated by the electric motor 10 in such a direction as to cause the outer ring member 12 to move in the axially forward direction (toward the brake disk 17), the outer ring member 12 presses the friction pad 15, so that the friction pads 14 and 15, shown in FIG. 1, are pressed against the brake disk 17, thereby applying a braking force to the vehicle wheel configured to rotate together with the brake disk 17. On the other hand, when the rotary shaft 11 is rotated by the electric motor 10 in such a direction as to cause the outer ring member 12 to move in the axially rearward direction (toward the electric motor 10), the friction pads 14 and 15, shown in FIG. 1, are separated from the brake disk 17, thereby releasing the braking force which has been applied to the vehicle wheel.

When the friction pads 14 and 15 are pressed against the brake disk 17 by the axially forward movement of the outer ring member 12, the load due to the axially rearward reaction force is applied to the flange member 33 of the load sensor 16 through the carrier plate 13B$_2$ and the thrust bearing 40 (see the arrow in FIG. 6A). As a result thereof, the elastic member 36 between the flange member 33 and the support member 34 is compressed according to the magnitude of the load applied to the flange member, thereby allowing the flange member 33 and the support member 34 (the magnetic target 35A and the magnetic sensor element 35B) to axially slide and move relative to each other. When the relative movement amount increases as the load applied to the flange member increases, the step 33A of the flange member 33 and the protrusion 34A of the support member 34 abut against each other at the support portion P$_2$ (see FIG. 6B), thereby preventing any further sliding movement of the flange member 33 relative to the support member 34.

When the load applied to the flange 33 enters a high load range in which the load is higher than the predetermined load value, the flange member 33 begins to axially deflect about the support portion P$_2$, so that the flange member 33 and the support member 34 further move relative to each other. The output signal of the magnetic sensor element 35B changes according to the relative movement amount in the low load range, and the relative movement amount in the high load range. By grasping, beforehand, the relationship between the magnitude of the above output signal, and the magnitude of the load applied to the flange member 33, it is possible to detect the magnitude of the axial load applied to the flange member 33 based on the output signal of the magnetic sensor element 35B.

Figure 7:
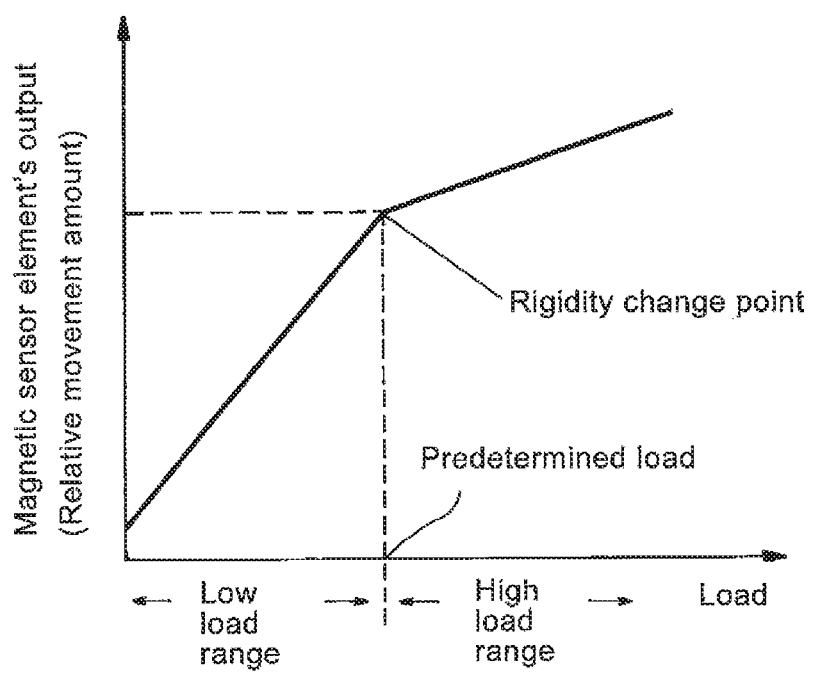
FIG. 7 is a graph showing the relationship between the load applied to a flange member and the output of a magnetic sensor element.

The graph of FIG. 7 shows the relationship between the load applied to the flange member 33 and the output of the magnetic sensor element 35B. As shown in FIG. 7, the magnetic sensor element 35B of this embodiment is configured such that, when the load applied to the flange member 33 exceeds a predetermined value (rigidity change point), which corresponds to the above-mentioned the predetermined load value, the relationship between the load applied to the flange member and the output of the magnetic sensor element changes.

In particular, since, in this embodiment, the elastic member 36A, which is lower in rigidity than the flange member 33, is disposed between the flange member 33 and the support member 34, the gradient of the graph is larger in the low load range than in the high load range. This means that the relative movement amount with respect to the change of the load applied to the flange member is larger in the low load range (in which the load is equal to or lower than the predetermined load value) than in the high load range (in which the load is higher than the predetermined load value).

This enables detection of the change of the load applied to the flange member 33 with higher sensitivity in the low load range than in the high load range. Therefore, when a driver applies the brake, it is possible to generate an accurate braking force in the low load range, in which the braking force is weak. Moreover, due to the rigidity of the flange member 33, it is possible to ensure durability and responsiveness with respect to repeated loads in the high load range. The graph of FIG. 7 is shown merely as an example, and the gradient of the graph can be appropriately changed by changing the rigidity of the elastic member 36A and/or the rigidity of the flange member 33.

Figure 8A:
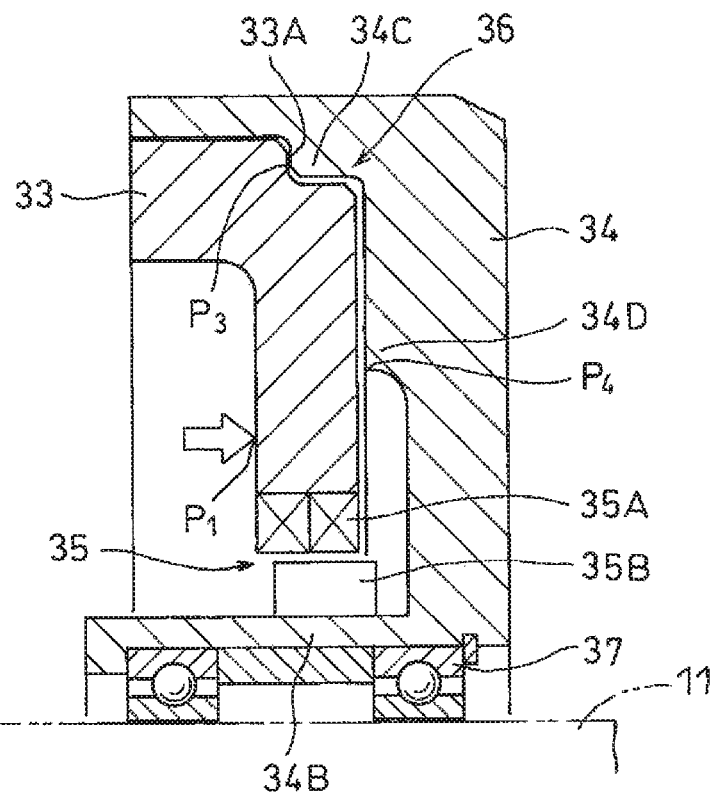
FIG. 8A is a sectional view of a portion of a load sensor according to a second embodiment of the present invention, when seen from its lateral side, the sectional view illustrating a low load range.
Figure 8B:
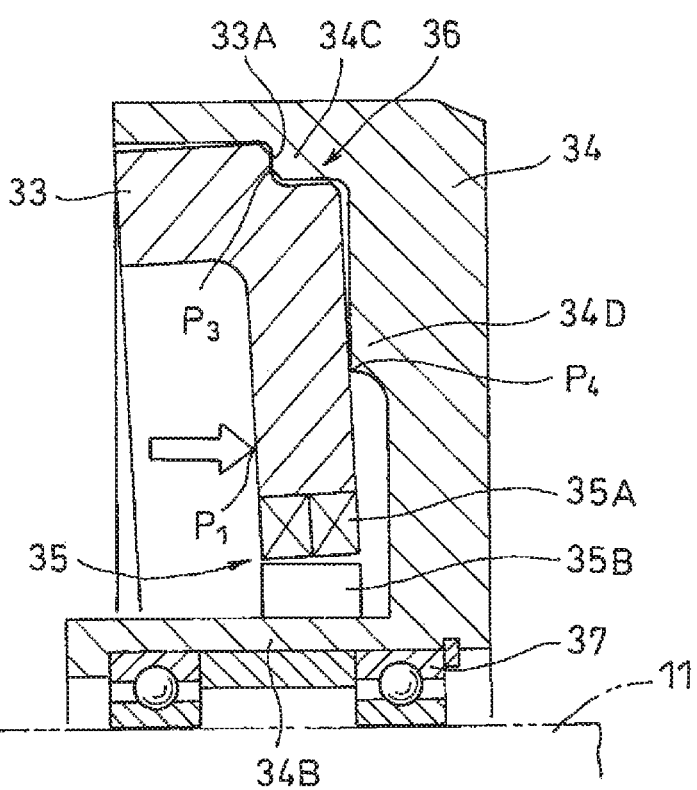
FIG. 8B is a sectional view of a portion of the load sensor according to the second embodiment, when seen from its lateral side, the sectional view illustrating a high load range.

FIGS. 8A and 8B illustrate a load sensor 16 according to the second embodiment of the present invention. The load sensor 16 of the second embodiment is the same as the load sensor 16 of the first embodiment in that it includes a flange member 33, a support member 34, a magnetic target 35A, a magnetic sensor element 35B, and a variable detection sensitivity mechanism 36. However, the variable detection sensitivity mechanism 36 of the second embodiment is different in structure from that of the first embodiment.

Specifically, the variable detection sensitivity mechanism 36 of the second embodiment includes a first support portion $P_3$ at which an axial surface of a step 33A formed on the flange member 33 can abut against an axial surface of a first protrusion 34C formed on the support member 34; and a second support portion $P_4$ at which an axial surface of the flange member 33 can abut against an axial surface of a second protrusion 34D formed on the support member 34.

The first support portion $P_3$ is a portion at which the flange member 33 and the support member 34 abut against each other while the load applied to the flange member 33 is in the low load range, in which the load is equal to or lower than the predetermined load value. The second support portion $P_4$ is a portion at which the flange member 33 and the support member 34 abut against each other while the load applied to the flange member 33 is in the high load range, in which the load is higher than the predetermined load value.

While the load applied to the flange member 33 is in the low load range, the flange member 33 and the support member 34 abut against each other at the first support portion $P_3$, and the flange member 33 deflects about the first support portion $P_3$ such that the flange member 33 and the support member 34 (the magnetic target 35A and the magnetic sensor element 35B) move relative to each other, due to the load applied to the flange member 33. When the load applied to the flange member enters the high load range, in which the load is higher than the predetermined load value, the flange member 33 and the support member 34 abut against each other at the second support portion $P_4$. Here, the flange member 33 further deflects about the second support portion $P_4$ such that the flange member 33 and the support member 34 further move relative to each other, due to the load applied to the flange member 33.

Since the rigidity of the flange member 33 changes at the respective support portions functioning as fulcrums, the amount by which the flange member 33 deflects (i.e., is displaced) with respect to the change of the load applied to the flange member 33 is smaller when the flange member 33 is deflected about the second support portion $P_4$ than about the first support portion $P_3$. Therefore, as shown in FIG. 7, the gradient of the graph is larger in the low load range than in the high load range. This enables detection of the change of the load applied to the flange member 33 with higher sensitivity in the low load range than in the high load range. Therefore, when a driver applies the brake, it is possible to generate an accurate braking force in the low load range, in which a braking force is weak. Moreover, due to the rigidity of the flange member 33, it is possible to ensure durability and responsiveness with respect to repeated loads in the high load range.

Figure 9A:
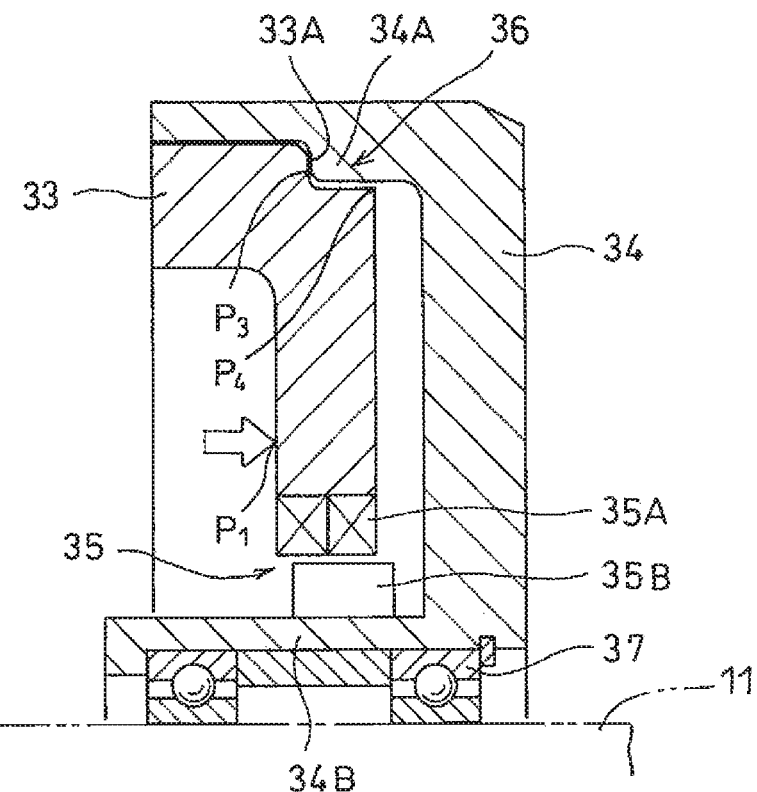
FIG. 9A is a sectional view of a portion of a load sensor according to a third embodiment of the present invention, when seen from its lateral side, the sectional view illustrating a low load range.
Figure 9B:
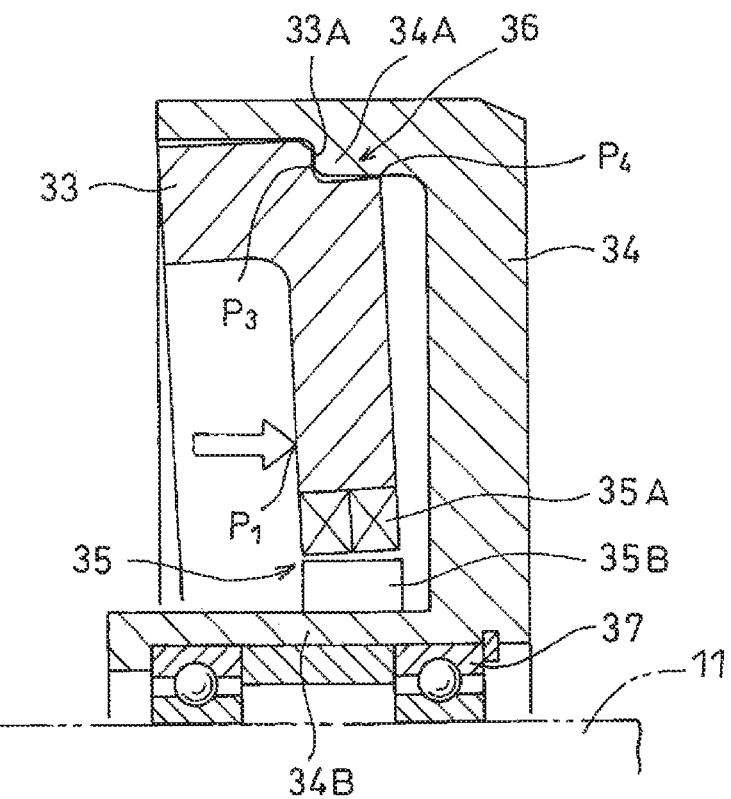
FIG. 9B is a sectional view of a portion of the load sensor according to the third embodiment, when seen from its lateral side, the sectional view illustrating a high load range.

FIGS. 9A and 9B illustrate a load sensor 16 according to the third embodiment of the present invention. The load sensor 16 of the third embodiment is identical in basic structure to the load sensor 16 of the second embodiment, but the variable detection sensitivity mechanism 36 is slightly different in structure from the detection sensitivity variable mechanism 36 of the second embodiment.

Specifically, the variable detection sensitivity mechanism 36 of the third embodiment includes a first support portion $P_3$ at which an axial surface of a step 33A formed on the flange member 33 can abut against an axial surface of a protrusion 34A formed on the support member 34; and a second support portion $P_4$ at which a radial surface of the step 33A can abut against a radial surface of the protrusion 34A.

The first support portion $P_3$ is a portion at which the flange member 33 and the support member 34 abut against each other while the load applied to the flange member 33 is in the low load range, in which the load is equal to or lower than the predetermined load value. The second support portion $P_4$ is a portion at which the flange member 33 and the support member 34 abut against each other while the load applied to the flange member 33 is in the high load range, in which the load is higher than the predetermined load value.

As with the load sensor 16 of the second embodiment, the load sensor 16 of the third embodiment enables detection the change of the load applied to the flange member 33 with higher sensitivity in the low load range than in the high load range. Therefore, when a driver applies the brake, it is possible to generate an accurate braking force in the low load range, in which a braking force is weak. Moreover, due to the rigidity of the flange member 33, it is possible to ensure durability and responsiveness with respect to repeated loads in the high load range.

While, in each of the above embodiments, a magnetic load sensor is used as the load sensor 16, the load sensor 16 is not limited to a magnetic one. For example, a strain gauge sensor may be used as the load sensor 16.

The electromechanical brake system and the load sensor 16 according to each of the above embodiments are merely examples. The shapes, numbers, arrangements, and materials of the components of the electromechanical brake system, including the load sensor 16, may be appropriately altered, provided that it is possible to achieve the object of the present invention. In particular, the object is to ensure both high detection sensitivity with respect to the change of the load applied to the flange member in the low load range, and durability and responsiveness in the high load range.

In each of the above embodiments, the variable detection sensitivity mechanism 36 is configured such that the detection sensitivity of the load sensor changes in two load ranges, i.e., the low load range and the high load ranges. However, the variable detection sensitivity mechanism 36 may be configured such that the detection sensitivity of the load sensor changes in a stepwise or continuous manner in more than two load ranges. For example, by using the second protrusion 34D of the load sensor 16 of the second embodiment in the load sensor 16 of the first embodiment, it is possible to change the detection sensitivity in three steps.

DESCRIPTION OF REFERENCE NUMERALS

10: electric motor
11: rotary shaft
12: linear motion member (outer ring member)
13: linear motion conversion mechanism (planetary roller screw mechanism)
15: friction pad
16: load sensor
33: flange member
34: support member
35: displacement detecting mechanism
35A: magnetic target
35B: magnetic sensor element
36: variable detection sensitivity mechanism
36A: elastic member
$P_1$: load receiving portion
$P_2$: support portion
$P_3$: first support portion
$P_4$: second support portion

The invention claimed is:

1. A load sensor comprising:
a flange member configured to deflect when receiving, at a load receiving portion, a load from a front side in an axial direction;
a support member configured to support the flange member from a rear side in the axial direction, at a support portion displaced from the load receiving portion in a radial direction orthogonal to the axial direction;
a displacement detecting mechanism configured to detect a movement amount of the flange member relative to the support member; and
a variable detection sensitivity mechanism configured to enable the relative movement amount with respect to a change of the load applied to the flange member to be larger in a low load range in which the load is equal to or lower than a predetermined load value than in a high load range in which the load is higher than the predetermined load value,
wherein the variable detection sensitivity mechanism comprises an elastic member disposed between the flange member and the support member, the elastic member being configured such that, while the load is equal to or lower than the predetermined load value, the elastic member is expandable and compressible according to a magnitude of the load so as to allow the flange member and the support member to move relative to each other in directions in which the elastic member is expanded and compressed.

2. A load sensor comprising:
a flange member configured to deflect when receiving, at a load receiving portion, a load from a front side in an axial direction;
a support member configured to support the flange member from a rear side in the axial direction, at a support portion displaced from the load receiving portion in a radial direction orthogonal to the axial direction;
a displacement detecting mechanism configured to detect a movement amount of the flange member relative to the support member; and
a variable detection sensitivity mechanism configured to enable the relative movement amount with respect to a change of the load applied to the flange member to be larger in a low load range in which the load is equal to or lower than a predetermined load value than in a high load range in which the load is higher than the predetermined load value,
wherein the support portion comprises:
a first support portion at which the flange member and the support member abut against each other while the load is equal to or lower than the predetermined load value; and
a second support portion at which the flange member and the support member abut against each other while the load is higher than the predetermined load value, and
wherein the variable detection sensitivity mechanism includes the first support portion and the second support portion.

3. The load sensor according to claim 1, wherein the displacement detecting mechanism comprises:
a magnetic target on a first one of the flange member and the support member, the magnetic target being configured to generate a magnetic flux; and
a magnetic sensor element on a second one of the flange member and the support member, the magnetic sensor element being configured to detect the magnetic flux generated by the magnetic target.

4. The load sensor according to claim 2, wherein the displacement detecting mechanism comprises:
a magnetic target on a first one of the flange member and the support member, the magnetic target being configured to generate a magnetic flux; and
a magnetic sensor element on a second one of the flange member and the support member, the magnetic sensor element being configured to detect the magnetic flux generated by the magnetic target.

5. An electromechanical brake system comprising:
an electric motor;
a rotary shaft configured to be rotated about an axis of the rotary shaft by a rotational driving force of the electric motor;
a linear motion member movable in an axial direction of the rotary shaft;
a linear motion conversion mechanism configured to convert rotation of the rotary shaft into an axial movement of the linear motion member;
a friction pad disposed on a first side of the linear motion member with respect to the axial direction, the friction pad being configured to move in the axial direction with the axial movement of the linear motion member; and
the load sensor according to claim 1, the load sensor being configured to detect a load due to a reaction force from the friction pad.

6. An electromechanical brake system comprising:
an electric motor;
a rotary shaft configured to be rotated about an axis of the rotary shaft by a rotational driving force of the electric motor;
a linear motion member movable in an axial direction of the rotary shaft;
a linear motion conversion mechanism configured to convert rotation of the rotary shaft into an axial movement of the linear motion member;
a friction pad disposed on a first side of the linear motion member with respect to the axial direction, the friction pad being configured to move in the axial direction with the axial movement of the linear motion member; and the load sensor according to claim 2, the load sensor being configured to detect a load due to a reaction force from the friction pad.

7. An electromechanical brake system comprising:

an electric motor;

a rotary shaft configured to be rotated about an axis of the rotary shaft by a rotational driving force of the electric motor;

a linear motion member movable in an axial direction of the rotary shaft;

a linear motion conversion mechanism configured to convert rotation of the rotary shaft into an axial movement of the linear motion member;

a friction pad disposed on a first side of the linear motion member with respect to the axial direction, the friction pad being configured to move in the axial direction with the axial movement of the linear motion member; and the load sensor according to claim 3, the load sensor being configured to detect a load due to a reaction force from the friction pad.

8. An electromechanical brake system comprising:

an electric motor;

a rotary shaft configured to be rotated about an axis of the rotary shaft by a rotational driving force of the electric motor;

a linear motion member movable in an axial direction of the rotary shaft;

a linear motion conversion mechanism configured to convert rotation of the rotary shaft into an axial movement of the linear motion member;

a friction pad disposed on a first side of the linear motion member with respect to the axial direction, the friction pad being configured to move in the axial direction with the axial movement of the linear motion member; and the load sensor according to claim 4, the load sensor being configured to detect a load due to a reaction force from the friction pad.

\* \* \* \* \*